US008219610B2

(12) United States Patent
Oikawa et al.

(10) Patent No.: US 8,219,610 B2
(45) Date of Patent: Jul. 10, 2012

(54) CONTENT PROVIDING SYSTEM, MONITORING SERVER, AND SIP PROXY SERVER

(75) Inventors: Tomoya Oikawa, Tokyo (JP); Masato Kawada, Tokyo (JP); Norio Kobota, Kanagawa (JP); Honggang Wang, Kanagawa (JM)

(73) Assignee: Sony Corporation, Tokyo (JP)

( * ) Notice: Subject to any disclaimer, the term of this patent is extended or adjusted under 35 U.S.C. 154(b) by 325 days.

(21) Appl. No.: 12/262,289

(22) Filed: Oct. 31, 2008

(65) Prior Publication Data
US 2009/0119401 A1    May 7, 2009

(30) Foreign Application Priority Data

Nov. 2, 2007   (JP) .............................. P2007-286790

(51) Int. Cl.
G06F 15/16    (2006.01)
G06F 15/173   (2006.01)
H04L 12/28    (2006.01)
H04L 12/56    (2006.01)

(52) U.S. Cl. ........ 709/203; 709/204; 709/224; 709/228; 370/389; 370/401

(58) Field of Classification Search .................. 709/223, 709/224, 203, 204, 228; 370/389, 401
See application file for complete search history.

(56) References Cited

U.S. PATENT DOCUMENTS

| 7,170,863 B1* | 1/2007 | Denman et al. ............... 370/260 |
| 2004/0003070 A1* | 1/2004 | Fernald et al. ................ 709/223 |
| 2004/0073596 A1* | 4/2004 | Kloninger et al. ............ 709/200 |
| 2004/0128344 A1* | 7/2004 | Trossen ......................... 709/203 |
| 2004/0243715 A1* | 12/2004 | Yokoyama ..................... 709/231 |
| 2005/0149443 A1* | 7/2005 | Torvinen .......................... 705/51 |
| 2005/0237999 A1* | 10/2005 | Shores et al. ................. 370/352 |
| 2006/0153064 A1* | 7/2006 | Caballero-McCann et al. ............................. 370/216 |
| 2007/0047571 A1* | 3/2007 | Kandikonda et al. ......... 370/449 |
| 2009/0177785 A1* | 7/2009 | Reid et al. ..................... 709/228 |
| 2010/0166162 A1* | 7/2010 | Mueller et al. ............. 379/93.01 |

FOREIGN PATENT DOCUMENTS

JP    2006-319619    11/2006

OTHER PUBLICATIONS

Takeshi Kuwahara et al., "A Proposal of Application—traffic Anomaly Detection Method for Large-Scale Backbone Network", Institute of Electronics, Information and Communication Engineers technical study report IN2007-61, Sep. 13, 2007.
Atsushi Kobayashi et al., "VoIP Network Monitoring Solution for IP Telephony Service as Public Communication Infrastructure", Mitsubishi Electric Technical report, vol. 80, No. 4, Apr. 25, 2006, pp. 35-38.

* cited by examiner

*Primary Examiner* — Joseph Avellino
*Assistant Examiner* — Aftab Nasir Khan
(74) *Attorney, Agent, or Firm* — Frommer Lawrence & Haug LLP; William S. Frommer; Thomas F. Presson

(57) ABSTRACT

A content providing system that provides content to a user terminal via a network includes a content providing server that is connected to the network and provides content, an SIP proxy server that is connected to the network and relays transmission and reception between the user terminal and the content providing server, and a monitoring server that is connected to the network and stores monitoring information regarding transmission and reception between the user terminal and the content providing server, the monitoring information being transmitted from the SIP proxy server.

5 Claims, 3 Drawing Sheets

CONTENT PROVIDING SYSTEM, MONITORING SERVER, AND SIP PROXY SERVER

CROSS REFERENCES TO RELATED APPLICATIONS

The present invention contains subject matter related to Japanese Patent Application JP 2007-286790 filed in the Japanese Patent Office on Nov. 2, 2007, the entire contents of which are incorporated herein by reference.

BACKGROUND OF THE INVENTION

1. Field of the Invention

The present invention relates to a content providing system, a monitoring server, and a Session Initiation Protocol (SIP) proxy server. The present invention relates more specifically to a content providing system and the like allowing an administrator of a content providing server to easily obtain a network bandwidth necessary for the content providing server or information used for obtaining a server resource by transmitting, from the SIP proxy server to the monitoring server, monitoring information regarding transmission and reception between a user terminal and the content providing server and by storing the monitoring information in the monitoring server.

2. Description of the Related Art

In recent years, movement toward the construction of a next generation network (NGN) has been becoming more active in which an existing line-switching telephone network is replaced with a network based on the Internet Protocol (IP) technology. The NGN has a bandwidth compensation function and a security function, and performs session control using an SIP.

In such an NGN, a user terminal can receive content such as video content or music content provided from a content providing server. In this case, it is very difficult to estimate how many user terminals access the content providing server and what network bandwidth and what server resources are necessary in the case.

For example, Japanese Unexamined Patent Application Publication Nos. 2004-110277, 2005-327155, and 2004-7228 describe examples of a content providing system capable of providing content such as video content or music content to a user terminal via a network such as the Internet from a content providing server.

SUMMARY OF THE INVENTION

As described above, with respect to a content providing system in which a user terminal is connected to a content providing server and receives content supplied therefrom, there is a problem in that it is difficult to estimate what network bandwidth and what resources are necessary for the content providing server.

It is desirable to allow an administrator of a content providing server to easily obtain a network bandwidth necessary for the content providing server or information used for obtaining a server resource.

A content providing system that provides content to a user terminal via a network according to an embodiment of the present invention includes a content providing server that is connected to the network and provides content, an SIP proxy server that is connected to the network and relays transmission and reception between the user terminal and the content providing server, and a monitoring server that is connected to the network and stores monitoring information regarding transmission and reception between the user terminal and the content providing server, the monitoring information being transmitted from the SIP proxy server.

According to the embodiment of the present invention, the monitoring information regarding transmission and reception between the user terminal and the content providing server is transmitted from the SIP proxy server to the monitoring server. The monitoring server receives and stores the monitoring information transmitted from the SIP proxy server. For example, the monitoring information is information regarding an SIP response transmitted from the content providing server to the user terminal in response to an SIP method transmitted from the user terminal to the content providing server.

In this way, since the monitoring information regarding transmission and reception between the user terminal and the content providing server is transmitted from the SIP proxy server to the monitoring server and is stored therein, for example, the administrator of the content providing server can easily obtain a network bandwidth necessary for the content providing server or information used for obtaining a server resource.

According to the embodiment of the present invention, the monitoring information regarding transmission and reception between the user terminal and the content providing server is transmitted from the SIP proxy server to the monitoring server and is stored therein, and thus the administrator of the content providing server can easily obtain a network bandwidth necessary for the content providing server or information used for obtaining a server resource.

DESCRIPTION OF THE PREFERRED EMBODIMENTS

In the following, an embodiment of the present invention will be described with reference to the attached drawings.

Figure 1:
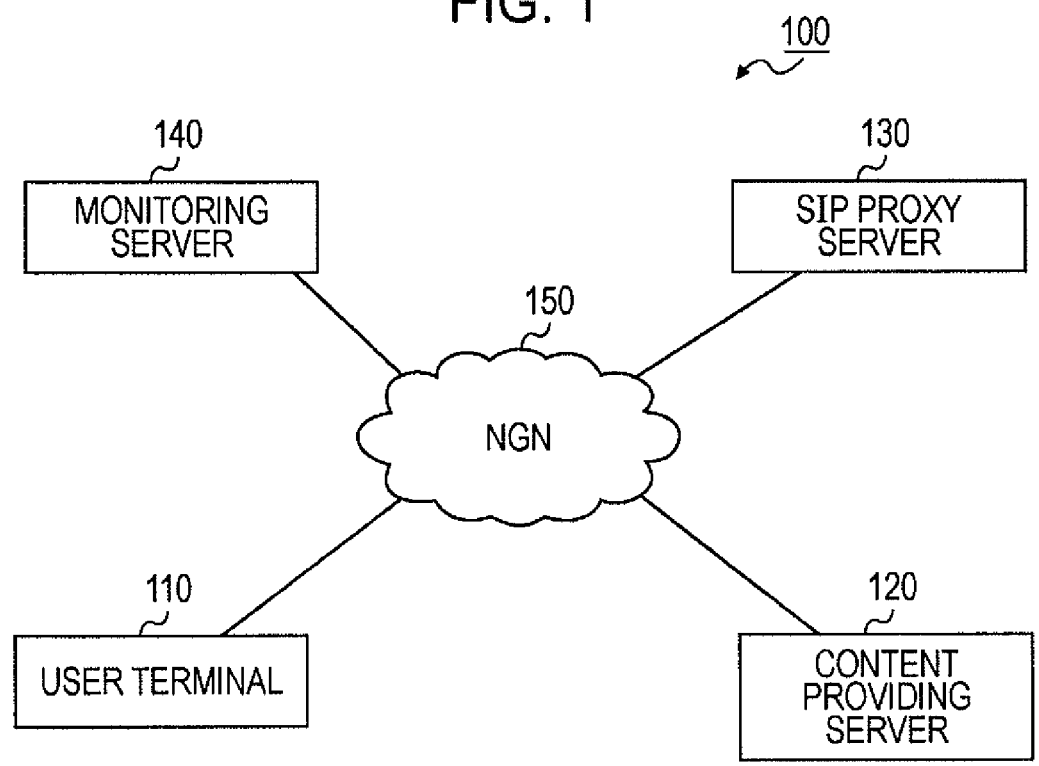
FIG. 1 is a block diagram showing an exemplary structure of a content providing system according to an embodiment of the present invention.

FIG. 1 shows an exemplary structure of a content providing system 100 as an embodiment. The content providing system 100 has a configuration in which a user terminal 110, a content providing server 120, an SIP proxy server 130, and a monitoring server 140 are connected to an NGN 150. The NGN 150 is a communication network in which session control is performed using an SIP.

In this content providing system 100, the user terminal 110, the content providing server 120, and the monitoring server 140 each operate as an SIP user agent client (UAC). The SIP UAC generates and transmits an SIP method (request), and receives and processes an SIP response.

The user terminal 110 is, for example, a personal computer, a set top box (STB), or the like. The content providing server 120 provides content such as video content or music content. The monitoring server 140, as described below, receives and stores monitoring information regarding transmission and reception between the user terminal 110 and the content providing server 120, the monitoring information being transmitted from the SIP proxy server 130.

Here, the monitoring information is, for example, information regarding an SIP method transmitted from the user terminal 110 to the content providing server 120 and an SIP response transmitted from the content providing server 120 to the user terminal 110 in response to the SIP method. Examples of the SIP method include INVITE (a session initiation request) and SUBSCRIBE (an event notification request). Examples of the SIP response include 2xx (success), 5xx (a server error), and 6xx (a global error).

In this case, the monitoring information transmitted from the SIP proxy server 130 to the monitoring server 140 includes, for example, the following information (a) through (d).

(a) SIP method type: INVITE/SUBSCRIBE
(b) SIP response type: 2xx OK/5xx server error/6xx global error
(c) SIP URI
(d) IP address Moreover, the SIP proxy server 130 operates as an SIP user agent server (UAS). The SIP UAS receives and processes an SIP method transmitted from the SIP UAC, and generates and transmits an SIP response.

The SIP proxy server 130 relays transmission and reception between the user terminal 110 and the content providing server 120. Moreover, as described above, the SIP proxy server 130 transmits, to the monitoring server 140, the monitoring information regarding transmission and reception between the user terminal 110 and the content providing server 120.

Here, in the content providing system 100 shown in FIG. 1, one user terminal 110 and one content providing server 120 are employed in order to simplify the description; however, there may be multiple user terminals and content providing servers.

Figure 2:
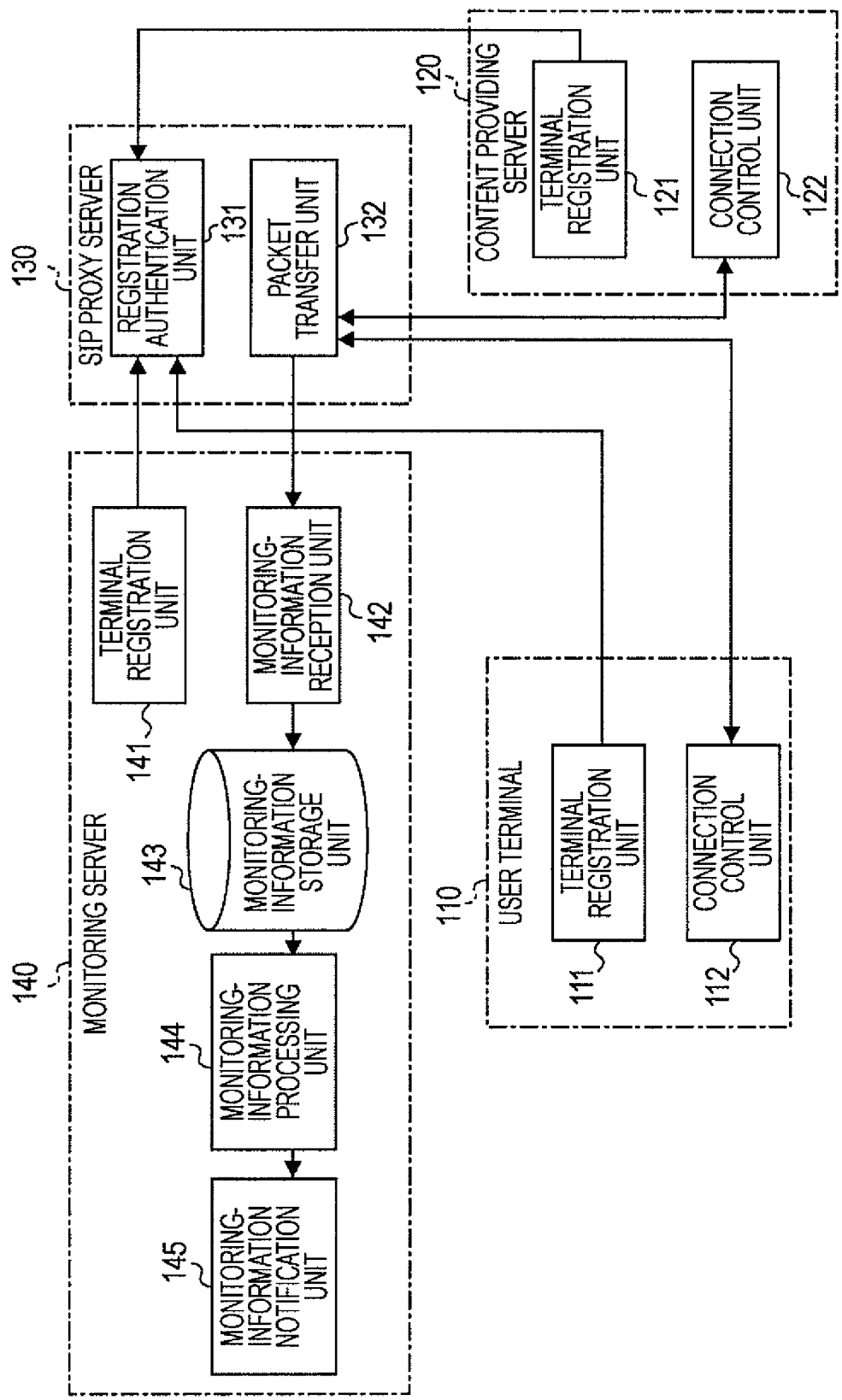
FIG. 2 is a block diagram showing a schematic structure of a portion related to the embodiment of the present invention in a user terminal, a content providing server, an SIP proxy server, and a monitoring server.

FIG. 2 shows a schematic structure of a part relating to the embodiment of the present invention in the user terminal 110, content providing server 120, SIP proxy server 130, and monitoring server 140.

The user terminal 110 is a personal computer, an STB, or the like as described above, and obtains content such as video content or music content from the content providing server 120. This user terminal 110 includes a terminal registration unit 111 and a connection control unit 112.

The terminal registration unit 111 registers information regarding the user terminal 110 using a REGISTER method into the SIP proxy server 130. The information to be registered is, for example, an SIP URI, an IP address, and the like of the user terminal 110. The connection control unit 112 is a function unit for performing communication with the content providing server 120. This connection control unit 112 transmits, for example, an INVITE method to the content providing server 120 via the SIP proxy server 130 when a session is established. Moreover, the connection control unit 112 transmits, for example, a SUBSCRIBE method to the content providing server 120 via the SIP proxy server 130 when an event notification is requested. Moreover, this connection control unit 112 receives an SIP response such as 2xx (success), 5xx (a server error), and 6xx (a global error) in response to an SIP method such as the INVITE method, the SUBSCRIBE method, and the like, the SIP response being transmitted from the content providing server 120 via the SIP proxy server 130.

The content providing server 120 includes a terminal registration unit 121 and a connection control unit 122. The terminal registration unit 121 registers information regarding the content providing server 120 using the REGISTER method into the SIP proxy server 130. The information to be registered is, for example, an SIP URI, an IP address, and the like of the content providing server 120. The connection control unit 122 is a function unit for performing communication with the user terminal 110. This connection control unit 122 receives, for example, the INVITE method transmitted from the user terminal 110 via the SIP proxy server 130. Moreover, the connection control unit 122 receives, for example, the SUBSCRIBE method transmitted from the user terminal 110 via the SIP proxy server 130. Moreover, this connection control unit 122 transmits, to the user terminal 110 via the SIP proxy server 130, an SIP response such as 2xx (success), 5xx (a server error), and 6xx (a global error) in response to an SIP method such as the INVITE method, the SUBSCRIBE method, and the like.

The SIP proxy server 130 includes a registration authentication unit 131 and a packet transfer unit 132. The registration authentication unit 131 receives the REGISTER methods transmitted from the SIP UACs (the user terminal 110, the content providing server 120, and the monitoring server 140) and accepts registration requests. This registration authentication unit 131 receives the REGISTER methods and updates a database (not shown) for registration. In this case, for each of the SIP UACs, information regarding a transmission source specified by one of the REGISTER methods, for example, an SIP URI and an IP address, is registered as the address of the SIP UAC into the database. This allows each of the SIP UACs to receive a method transmitted from a different SIP UAC using a unique SIP URI of the SIP UAC. Moreover, after the reception of the REGISTER method, the registration authentication unit 131 may perform authentication to determine whether an SIP UAC that is a transmission source can be registered.

The packet transfer unit 132 accepts connection requests transmitted from the SIP UACs and transfers packets to SIP UACs that are transmission destinations. This packet transfer unit 132 receives, for example, the INVITE method transmitted from the user terminal 110 to the content providing server 120, obtains an IP address of the content providing server 120 using the transmission-destination address included in the header of the INVITE method as a key, and transfers the received INVITE method to the IP address.

Moreover, the packet transfer unit 132 receives, for example, the SUBSCRIBE method transmitted from the user terminal 110 to the content providing server 120, obtains an IP address of the content providing server 120 using the transmission-destination address included in the header of the SUBSCRIBE method as a key, and transfers the received SUBSCRIBE method to the IP address.

Moreover, the packet transfer unit 132 monitors transmission and reception between the user terminal 110 and the content providing server 120, and transmits monitoring information to the monitoring server 140. As described above, the monitoring information is, for example, information regarding an SIP method transmitted from the user terminal 110 to the content providing server 120 and an SIP response transmitted from the content providing server 120 to the user terminal 110 in response to the SIP method, and the like. Accordingly, the packet transfer unit 132 is included in a monitoring-information transmission unit.

The monitoring server 140 includes a terminal registration unit 141, a monitoring-information reception unit 142, a monitoring-information storage unit 143, a monitoring-information processing unit 144, and a monitoring-information notification unit 145. The terminal registration unit 141 registers information regarding the monitoring server 140 using the REGISTER method into the SIP proxy server 130. The information to be registered is, for example, an SIP URI, an IP address, and the like of the monitoring server 140.

The monitoring-information reception unit 142 receives the monitoring information transmitted from the SIP proxy server 130. The monitoring-information storage unit 143 stores the monitoring information received by the monitoring-information reception unit 142.

The monitoring-information processing unit 144 processes the monitoring information stored in the monitoring-information storage unit 143. For example, the monitoring-information processing unit 144 counts the number of successes and the number of errors with respect to the INVITE method, and those with respect to the SUBSCRIBE method. Moreover, for example, the monitoring-information processing unit 144 calculates the number of users of the content providing server 120 at regular time intervals from the number of successes and the number of errors with respect to the INVITE method. The monitoring-information notification unit 145 sends a notification of the processing result of the monitoring-information processing unit 144 to, for example, the administrator of the content providing server 120 via the NGN 150.

Figure 3:
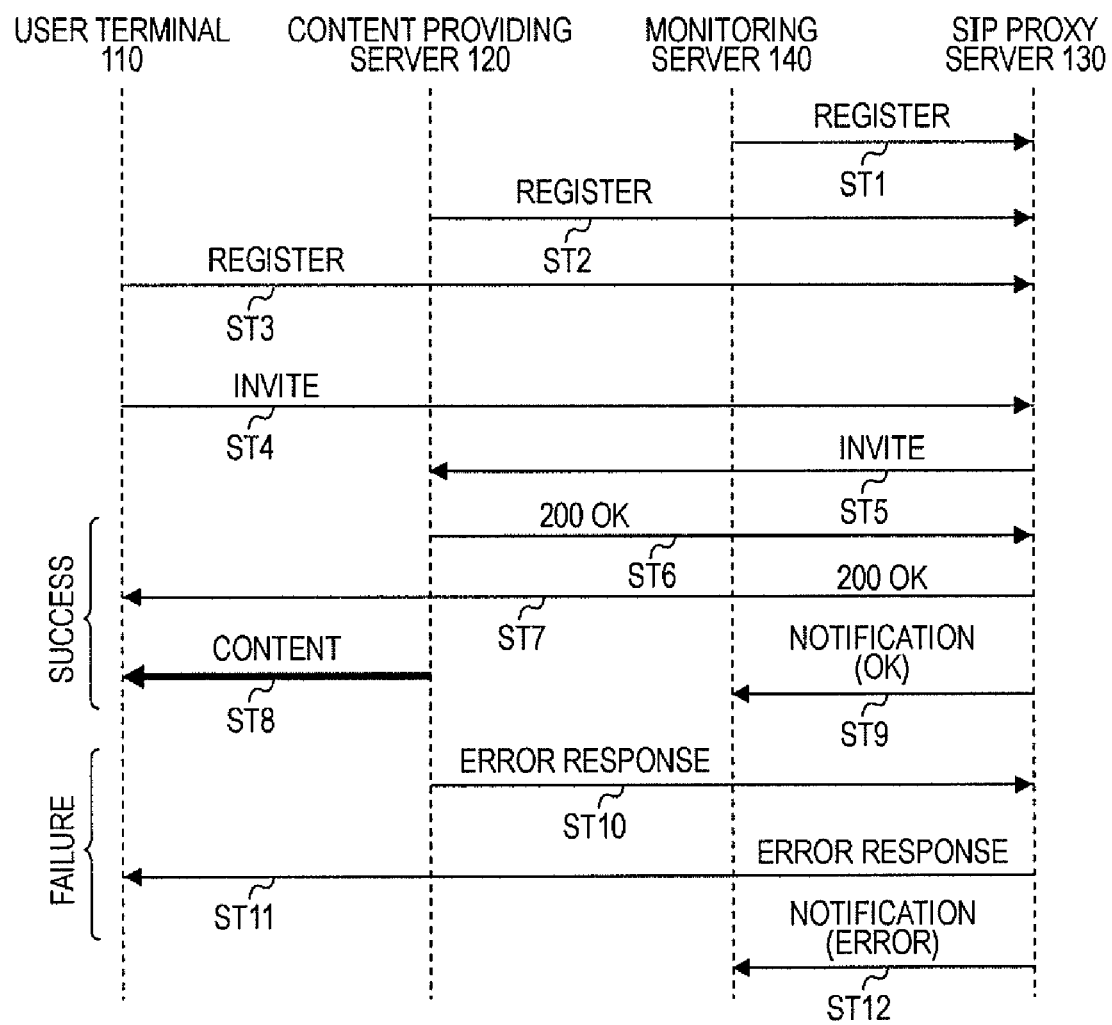
FIG. 3 is a sequence diagram showing exemplary processing performed in the content providing system.

FIG. 3 shows exemplary processing of the content providing system 100 shown in FIG. 1.

First, in step ST1, the terminal registration unit 141 of the monitoring server 140 transmits the REGISTER method to the SIP proxy server 130 in order to register the monitoring server 140. The SIP proxy server 130 receives the REGISTER method transmitted from the monitoring server 140 at the registration authentication unit 131, and registers the monitoring server 140 into the database for registration after authentication, ensuring that the monitoring server 140 is a terminal that can be registered therein.

Next, in step ST2, the terminal registration unit 121 of the content providing server 120 transmits the REGISTER method to the SIP proxy server 130 in order to register the content providing server 120. The SIP proxy server 130 receives the REGISTER method transmitted from the content providing server 120 at the registration authentication unit 131, and registers the content providing server 120 into the database for registration after authentication, ensuring that the content providing server 120 is a terminal that can be registered therein.

Next, in step ST3, the terminal registration unit 111 of the user terminal 110 transmits the REGISTER method to the SIP proxy server 130 in order to register the user terminal 110. The SIP proxy server 130 receives the REGISTER method transmitted from the user terminal 110 at the registration authentication unit 131, and registers the user terminal 110 into the database for registration after authentication, ensuring that the user terminal 110 is a terminal that can be registered therein.

Next, in step ST4, the connection control unit 112 of the user terminal 110 transmits the INVITE method, which is a session start request, to the SIP proxy server 130. Then, in step ST5, the packet transfer unit 132 of the SIP proxy server 130 receives the INVITE method transmitted from the user terminal 110, and transfers the INVITE method to the content providing server 120. The connection control unit 122 of the content providing server 120 receives the INVITE method transferred from the SIP proxy server 130.

Next, when the content providing server 120 accepts the session start request, in step ST6, the content providing server 120 transmits a response indicating success (200 OK) to the SIP proxy server 130. Then, in step ST7, the packet transfer unit 132 of the SIP proxy server 130 receives the response indicating success (200 OK) transmitted from the content providing server 120, and transfers the response to the user terminal 110. The connection control unit 112 of the user terminal 110 receives the response indicating success (200 OK) transferred from the SIP proxy server 130.

After the session between the user terminal 110 and the content providing server 120 is established in this way, for example, in step ST8, content is supplied from the content providing server 120 to the user terminal 110.

In step ST9, the SIP proxy server 130 sends a notification of the monitoring information (OK=success) to the monitoring server 140. This monitoring information includes information indicating that the method is INVITE and the response is 200 OK, and the SIP URI, IP address, and the like of the user terminal 110.

In this case, the packet transfer unit 132 of the SIP proxy server 130 transmits the monitoring information to the monitoring server 140. The monitoring-information reception unit 142 of the monitoring server 140 receives the monitoring information transmitted from the SIP proxy server 130. The monitoring-information storage unit 143 of the monitoring server 140 stores the monitoring information received by the monitoring-information reception unit 142.

In contrast, when the content providing server 120 does not accept the session start request, in step ST10, the content providing server 120 transmits a response indicating an error (hereinafter referred to as an "error response") such as 5xx (a server error), 6xx (a global error), and the like to the SIP proxy server 130. In step ST11, the packet transfer unit 132 of the SIP proxy server 130 receives the error response transmitted from the content providing server 120, and transfers the response to the user terminal 110. The connection control unit 112 of the user terminal 110 receives the error response transferred from the SIP proxy server 130.

In step ST12, the SIP proxy server 130 sends a notification of the monitoring information (error=failure) to the monitoring server 140. This monitoring information includes information indicating that the method is INVITE and the response is an error (5xx or 6xx), and the SIP URI, IP address, and the like of the user terminal 110.

In this case, the packet transfer unit 132 of the SIP proxy server 130 transmits the monitoring information to the monitoring server 140. The monitoring-information reception unit 142 of the monitoring server 140 receives the monitoring information transmitted from the SIP proxy server 130. The monitoring-information storage unit 143 of the monitoring server 140 stores the monitoring information received by the monitoring-information reception unit 142.

In the content providing system 100 shown in FIG. 1, the monitoring information regarding transmission and reception between the user terminal 110 and the content providing server 120 is transmitted from the SIP proxy server 130 to the monitoring server 140, and the monitoring information is stored in the monitoring-information storage unit 143 of the monitoring server 140. The monitoring information stored in the monitoring-information storage unit 143 is processed by the monitoring-information processing unit 144.

For example, the monitoring-information processing unit 144 counts the number of successes and the number of errors with respect to the INVITE method and those with respect to the SUBSCRIBE method. Moreover, for example, the monitoring-information processing unit 144 calculates the number of users of the content providing server 120 at regular time intervals from the number of successes and the number of errors with respect to the INVITE method.

The processing result of this monitoring-information processing unit 144 is sent as a notification by the monitoring-information notification unit 145 to the administrator of the content providing server 120 via the NGN 150. Thus, the administrator of the content providing server 120 can easily obtain, from the monitoring server 140, a network band necessary for the content providing server 120 or information used for obtaining a server resource.

Here, in the above-described embodiment, an example in which the SIP proxy server 130 and the monitoring server 140 are provided at separate positions has been described; however, there may be a case in which the SIP proxy server 130 and the monitoring server 140 are provided at the same position, for example, a case in which they are constituted by the same computer.

It should be understood by those skilled in the art that various modifications, combinations, sub-combinations and alterations may occur depending on design requirements and other factors insofar as they are within the scope of the appended claims or the equivalents thereof.

What is claimed is:

1. A content providing system that provides content to a user terminal via a network, the content providing system comprising:
    a content providing server that is connected to the network and provides content;
    an SIP proxy server that is connected to the network and relays transmission and reception between the user terminal and the content providing server; and
    a monitoring server that is connected to the network and stores monitoring information regarding transmission and reception between the user terminal and the content providing server, the monitoring information being transmitted from the SIP proxy server,
    wherein the monitoring server determines a number of users at a regular time interval from a number of successes and a number of errors with respect to an INVITE method, and the monitoring server sends a notification regarding the number of the users to the content providing server that obtains a network bandwidth based on the notification; and
    wherein the monitoring information includes a SIP method type, a SIP response type, and an IP address.

2. A monitoring server that is connected to a network to which a content providing server that provides content and an SIP proxy server that relays transmission and reception between a user terminal and the content providing server are connected, the monitoring server comprising:
    a monitoring-information reception unit that receives monitoring information regarding transmission and reception between the user terminal and the content providing server, the monitoring information being sent from the SIP proxy server; and
    a monitoring-information storage unit that stores the monitoring information received by the monitoring-information reception unit,
    wherein the monitoring server further comprises a processing unit and a notification unit,
    wherein the processing unit determines a number of users at a regular time interval from a number of successes and a number of errors with respect to an INVITE method, and the notification unit sends a notification regarding the number of the users to the content providing server that obtains a network bandwidth based on the notification; and
    wherein the monitoring information includes a SIP method type, a SIP response type, and an IP address.

3. The monitoring server according to claim 2,
    wherein the monitoring information is information regarding a SIP response transmitted from the content providing server to the user terminal in response to an SIP method transmitted from the user terminal to the content providing server.

4. An SIP proxy server that is connected to a network, to which a content providing server that provides content is connected, and relays transmission and reception between a user terminal and the content providing server, the SIP proxy server comprising:
    a monitoring-information transmission unit that transmits, to a monitoring server that is connected to the network, monitoring information regarding transmission and reception between the user terminal and the content providing server,
    wherein the monitoring server determines a number of users at a regular time interval from a number of successes and a number of errors with respect to an INVITE method, and the monitoring server sends a notification regarding the number of the users to the content providing server that obtains a network bandwidth based on the notification; and
    wherein the monitoring information includes a SIP method type, a SIP response type, and an IP address.

5. The SIP proxy server according to claim 4,
    wherein the monitoring information is information regarding an SIP response transmitted from the content providing server to the user terminal in response to an SIP method transmitted from the user terminal to the content providing server.

* * * * *